Nov. 15, 1932.  C. ORSETT  1,887,718
VEHICLE SUSPENSION
Filed Feb. 24, 1931
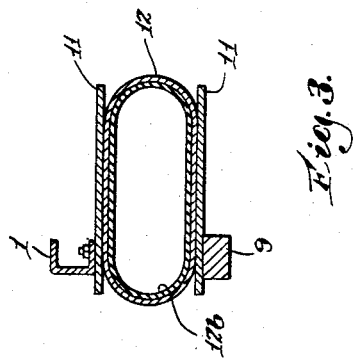
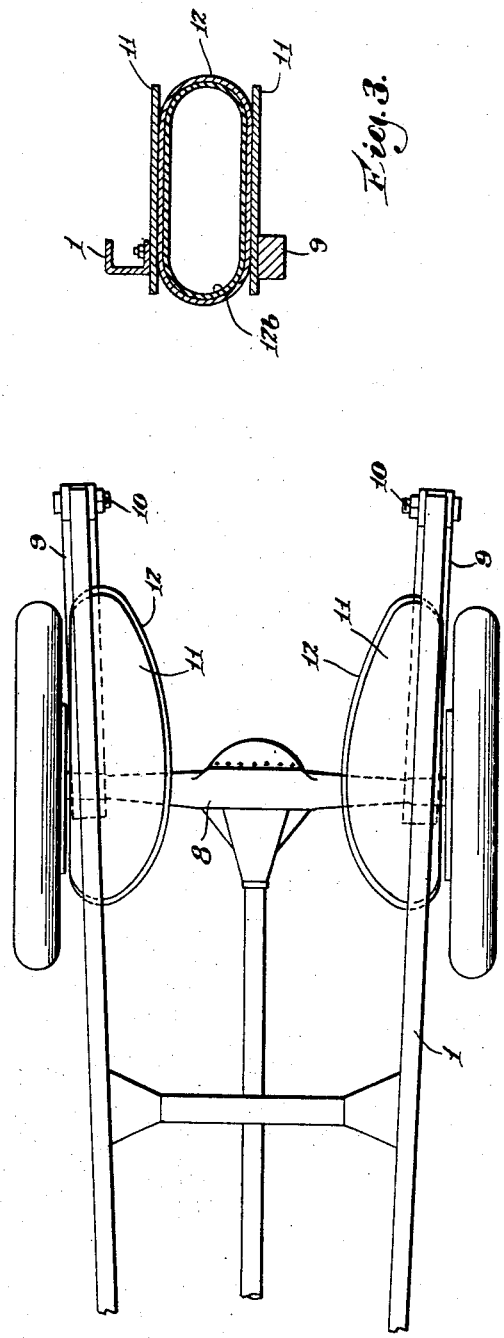
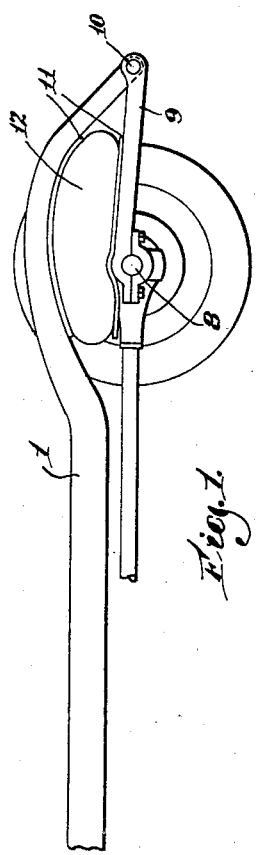
Inventor
Coy Orsett Patented Nov. 15, 1932

1,887,718

UNITED STATES PATENT OFFICE

COY ORSETT, OF BOSTON, MASSACHUSETTS

VEHICLE SUSPENSION

Application filed February 24, 1931. Serial No. 517,850.

My invention relates to a new type of rear end pneumatic spring suspension for vehicles and is a division of the applicant's original application #303,350 filed August 31, 1928, issued September 22, 1931 as Patent 1,824,096, and has for an object the complete departure from the conventional type of metallic spring suspension.

Another object of my invention is to provide an entirely new type of rear end radius rod.

Still another object is to provide a new type of radius rod member to function in place of the steel leaf spring in transmitting driving torque from the wheels to the chassis.

In the drawing, wherein like numerals refer to like parts throughout the views:

Figure 1 is a side elevation of the rear end running gear.

Figure 2 is a plan view, showing the rear portion of a vehicle.

Figure 3 represents a cross section showing one of my improved pneumatic spring cushions.

I obtain the function of the driving part of the rear end of the vehicle by attaching two radius rods 9 to the axle housing, 8. These radius rods are necessary in this invention to transmit the torque to vehicle frame.

I now place a pneumatic cushion 12, to function in the place of the conventional leaf spring. I employ especially made air inflation bags of sufficient strength and resiliency to carry the load according to the requirements, and I place these air bags in between the rear end running gear and the channel frame of the chassis, 1.

According to this invention, the arrangement and combination for this type of automobile pneumatic suspension and the application of this principle of vehicle suspension to the rear end of the vehicle differs from the front end in design of the radius rods, but the principle remains the same. This rear end radius member 9 of channel steel is light in weight, yet strong enough to function in place of the conventional steel spring leaf set. I pivotally attach one end of this member to the end part of the channel frame of the chassis by a connection at 10, while the other end of said member is secured to the sleeve of the rear axle housing, 8. These radius members perform the function of transmitting driving torque to the car, the same function as is now performed by the ordinary steel leaf spring set. I now place by suitable means, a sole plate 11 or platform on the sleeve of the rear axle housing, and a similar platform on the under part of the channel frame of the chassis, and by placing the air bags 12B between these two platforms, I obtain the improved pneumatic spring suspension of this invention.

It must be understood that this new type of pneumatic auto-suspension has the advantage of inflation control from the operator of the car, as by suitable connections air can be compressed into the air bags (not shown) when more persons are carried and air let out of same when light loads are desired. These inflating and deflating connections can be attached to valves on the air bags and controlled by the operator through a small air compression tank connection, with pressure gauges giving the reading of the air pressure in each of the bags. The advantage of this type of air suspension and drive is that it is not subject to injury such as pneumatic tires are, as these air bags have no other contact but their sole plates or platforms which are especially affixed and constructed for their reception and functioning.

My invention is further described and defined in the form of a claim as follows:

In a vehicle spring suspension, the combination of a chassis having downwardly projecting end portions, a live-axle housing, longitudinally disposed radius rods, each having an end pivotally connected to one of said end portions of the chassis for movement in a vertical plane and the opposite end clamped to said axle housing and adapted to prevent rotation thereof, a pair of alined, flat, substantially oval shaped bearing plates at each side of the vehicle, secured to the chassis and running gear respectively, a shallow resilient pneumatic cushion disposed between and conforming to the size and shape of the bearing plates, said cushion being adapted to absorb road shocks transmitted to the vehicle running gear.

COY ORSETT.